(12) United States Patent
Haley, III

(10) Patent No.: US 6,881,340 B2
(45) Date of Patent: Apr. 19, 2005

(54) WASTEWATER TRICKLE TOWER(S) CONTROLLING AND GROOMING

(75) Inventor: John W. Haley, III, Providence, RI (US)

(73) Assignee: BioProcess Technologies Ltd., Portsmouth, RI (US)

( * ) Notice: Subject to any disclaimer, the term of this patent is extended or adjusted under 35 U.S.C. 154(b) by 90 days.

(21) Appl. No.: 10/375,386

(22) Filed: Feb. 27, 2003

(65) Prior Publication Data

US 2004/0000518 A1 Jan. 1, 2004

Related U.S. Application Data

(60) Provisional application No. 60/368,344, filed on Mar. 28, 2002.

(51) Int. Cl.[7] .................................................. C03F 3/04
(52) U.S. Cl. .......................... 210/614; 210/615; 210/86; 210/143; 210/150
(58) Field of Search ................................. 210/614, 615, 210/617, 618, 86, 143, 150, 151, 252

(56) References Cited

U.S. PATENT DOCUMENTS

| | | | |
|---|---|---|---|
| 978,889 A | * 12/1910 | Imhoff | 210/151 |
| 2,008,507 A | 7/1935 | Laughlin | |
| 2,142,196 A | * 1/1939 | Langdon | 210/615 |
| 2,308,866 A | 1/1943 | Dekema | |
| 2,580,764 A | * 1/1952 | Gunz | 210/151 |
| 3,238,124 A | 3/1966 | Burton | |
| 3,275,147 A | 9/1966 | Gilde | |
| 4,411,780 A | * 10/1983 | Suzuki et al. | 210/150 |
| 4,422,930 A | 12/1983 | Hatanaka | |
| 4,451,362 A | 5/1984 | Spelsberg | |
| 4,504,393 A | * 3/1985 | Davies | 210/614 |
| 4,717,519 A | 1/1988 | Sagami | |
| 4,729,828 A | 3/1988 | Miller | |
| 4,929,484 A | * 5/1990 | Basse | 210/150 |
| 5,011,605 A | * 4/1991 | Pape et al. | 210/615 |
| 5,085,766 A | 2/1992 | Born | |
| 5,397,474 A | 3/1995 | Henry | |
| 5,622,630 A | 4/1997 | Romano | |
| 5,863,433 A | * 1/1999 | Behrends | 210/150 |
| 5,976,377 A | 11/1999 | Hyfantis, Jr. et al. | |
| 6,241,889 B1 | 6/2001 | Haley, III | |
| 6,319,407 B1 | * 11/2001 | Maatta et al. | 210/615 |
| 6,406,630 B1 | * 6/2002 | Henry | 210/150 |

* cited by examiner

Primary Examiner—Christopher Upton
(74) Attorney, Agent, or Firm—Wildman, Harrold, Allen & Dixon LLP

(57) ABSTRACT

A wastewater treatment apparatus has a manifold interconnecting two or more trickle towers to enable wastewater to be sequentially moved through the trickle towers in different selective sequences. One or more sensors may sense the growth of biogrowth in the trickle towers, and when the sensed growth reaches a predetermined value, valves or other parts change the interconnection of the manifold to the trickle towers to change the sequence in which the wastewater moves through the trickle towers. A method of treating wastewater includes changing the sequence of flow through the trickle towers to achieve manual or automatic grooming of the biogrowth on the biomedia, so both improving the overall efficiency of the system and also prolonging its running time between maintenance shutdowns. Another embodiment has one or more trickle towers with suspended strands of biomedia down which the wastewater passes; a sensor senses increase in growth of biomass on at least a portion of the biomedia.

18 Claims, 13 Drawing Sheets

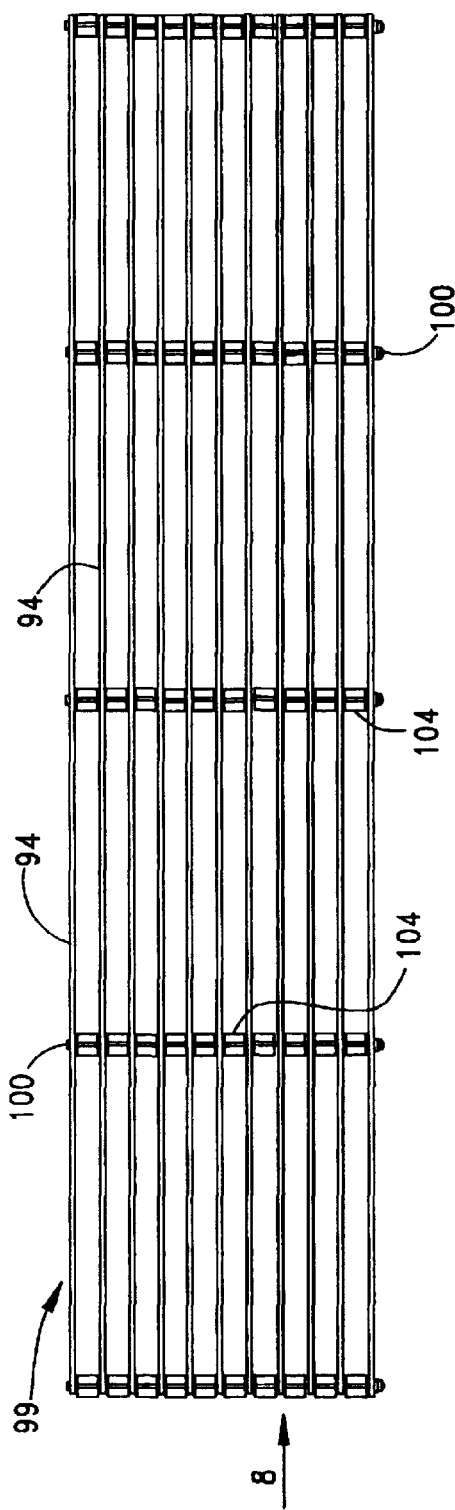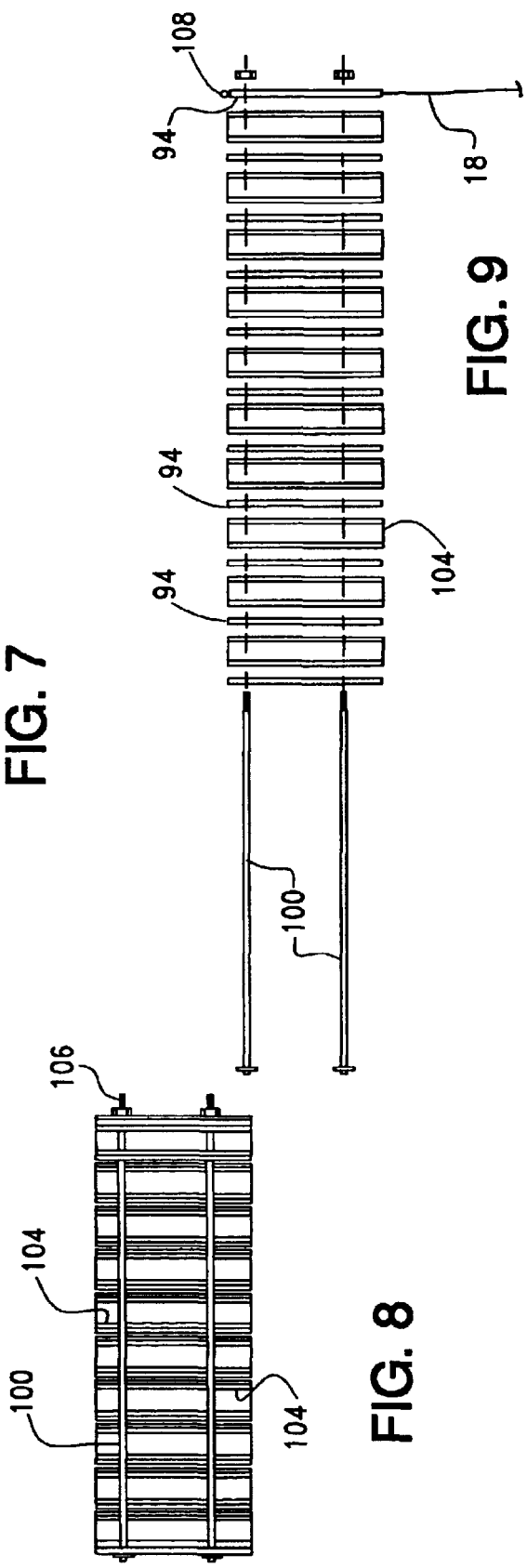
FIG. 7
FIG. 8
FIG. 9

WASTEWATER TRICKLE TOWER(S) CONTROLLING AND GROOMING

CROSS-REFERENCE TO RELATED APPLICATION

This application claims the priority of U.S. Provisional Application Ser. No. 60/368,344 filed Mar. 28, 2002.

FIELD OF THE INVENTION

This invention relates to the treatment of wastewater using one or more trickle towers employing biomedia. The invention particularly relates to the accumulation of biogrowth on the biomedia.

BACKGROUND OF THE INVENTION

With greater demands being placed on the treatment of wastewater by regulatory authorities, there has become a growing need for systems that will treat wastewater to a higher level of purity. This has also brought an increasing need for systems that are more versatile in design and can more readily be adapted to handle differing wastewater treatment requirements.

I have found that a trickle tower system employing strands of looped cord biomedia is more suited to handling today's increasing demands in wastewater treatment than the conventional systems currently in use. The initial approach of a looped cord biomedia trickle tower system is disclosed in my U.S. Pat. No. 6,241,889 published Jun. 5, 2001. While this trickle tower system has been promising, and the general approach employed appears correct, further improvements and modifications are now desirable for more widespread adoption by industry and civil authorities.

SUMMARY OF THE INVENTION

This invention is concerned with modifying and improving the wastewater treatment process and apparatus disclosed in the above U.S. Pat. No. 6,241,889 the whole disclosure of which is hereby incorporated herein by reference.

This invention is also concerned with developing further approaches to trickle tower treating of wastewater. Some of these approaches are particularly advantageous with looped cord biomedia, and others are advantageous with other biomedia and other systems in addition to being applicable with looped cord biomedia.

This invention is particularly concerned with controlling the growth of biogrowth on the biomedia in a trickle tower. In this way, by keeping this biogrowth to a manageable level, the trickle tower continuous to function to an acceptable level of efficiency in treating the wastewater. With a single trickle tower operation, the present invention can be employed to indicate when the biomedia needs cleaning or replacing. With a multi-trickle tower operation, the present invention can provide for manual or automatic grooming of the biomedia, so both improving the overall efficiency of the system and also prolonging its running time between maintenance shutdowns.

According to one aspect of the present invention, there is provided a wastewater treatment apparatus comprising a plurality of trickle towers containing biomedia, a plurality of wastewater discharge means for discharging wastewater at upper ends of the trickle towers to enable the wastewater to pass down the biomedia, and receptacles adjacent lower ends of the trickle towers for catching wastewater falling from the biomedia. Moving means are associated with the trickle towers for moving wastewater from the receptacles to the discharge means to enable wastewater to recirculate through the trickle towers. Manifold means is provided, interconnecting the trickle towers, and including selectively operable parts, for enabling wastewater to be sequentially moved through the trickle towers in different selective sequences.

The moving means preferably comprises one or more pumps associated with each trickle tower, but may comprise a water lift or conveyor.

The selectively operable parts preferably comprise valves for changing the path of flow of the wastewater, but alternatively or additionally may comprise disconnectable, reconnectable, and movable conduits, hoses, etc.

The biomedia may comprise strands of looped cord that preferably extend vertically and may be held under tension by tensioning means.

The tensioning means preferably comprises tensioning bolts by which the biomedia is supported or tensioning bolts at the bottom of the biomedia, but may comprise resilient members above or below the biomedia or weights at the bottom of the biomedia.

The manifold means preferably comprises a pipe system, but may alternatively or additionally comprise troughs, ducts, passageways, etc. A control system may be connected to the selectively operable parts and programmable to selectively operate these parts.

The wastewater discharge means may comprise rotating spray nozzles, alternatively or in addition the wastewater discharge means may comprise stationary spray nozzles. The wastewater discharge means may comprise an oscillating slot nozzle for cascading a sheet of wastewater back and forth over the biomedia.

The receptacles may comprise base trays with base recirculating tanks spaced from and connected to these base trays. On the other hand, the receptacles may be base recirculating tanks themselves.

Sensing means is preferably provided for sensing the amount of biogrowth accumulating on the biomedia in at least one of the trickle towers during operation.

The sensing means may provide an output signal. An indicator may be provided responsive to the signal, to provide an indication of the accumulation of the biogrowth in the particular trickle tower. The signal may be arranged to cause actuation of at least one selectively operable part when the amount of biogrowth accumulation reaches a predetermined level.

The sensing means may cause a plurality of the parts, e.g. valves, to be actuated to change the sequence of flow of the wastewater through the trickle towers upon the amount of biogrowth accumulation reaching a predetermined level.

The sensing means may comprise a yieldable member yieldable to increase in weight of at least a part of the biomedia. The yieldable member may comprise a spring. On the other hand, the yieldable member may comprise a load cell, a piezoelectric device, a potentiometer, an induction coil device, a fluidic system, a hydraulic system, etc. The sensing means may comprise instead, or in addition, a light or other electromagnetic beam sensing system or a system for sensing changes in mass. Conveniently, the sensing means may comprise a device sensitive to changes in tension or length of one or more strands of biomedia, when the biomedia is in strand form.

The apparatus may include a support structure, and the yieldable member may be connected between the support structure and at least a portion of the biomedia.

In a preferred embodiment, the apparatus includes weight sensitive means, responsive to increase in weight of at least a part (e.g. one or more strands) of the biomedia due to accumulation of biogrowth thereon, for causing operation of valves to change the sequence of movement of the wastewater through the trickle towers.

In another preferred embodiment, the apparatus includes sensing means associated with each trickle tower for independently sensing biogrowth on the biomedia in that tower, and for causing operation of valves to change the sequence in which the wastewater moves through the trickle towers so that the tower with the largest biogrowth is placed last in the sequence. In this way, the system can become at least partially self-grooming. This sensing means may sense weight or mass or both.

According to another aspect of the invention, there is provided a wastewater treatment apparatus comprising a plurality of trickle towers, each tower containing one or more cells, and each cell containing a plurality of vertically extending strands of biomedia. The towers are interconnected for the wastewater to pass through them in sequence, valves being associated with the towers for changing the sequence. Means is included, responsive to changes in weight and connected to at least a portion of the biomedia in at least one of the cells, for sensing increase in weight due to biogrowth forming on that biomedia, and for causing operation of at least one of the valves to change the sequence when a predetermined weight increase is sensed.

The means for sensing increase in weight may comprise a spring connected between the at least a portion of the biomedia and the trickle tower of that portion, the spring at least partly supporting that portion.

The strands may comprise looped cord biomedia, and are preferably tensioned vertically in the towers.

According to yet another aspect of the invention, there is provided a wastewater treatment apparatus comprising a trickle tower having a supporting structure, strands of biomedia suspended from this support structure with wastewater, when being treated, passing downwardly over the biomedia, and means for sensing increase in weight of the biomedia due to biogrowth forming thereon.

According to yet another aspect of the invention, there is provided a method of treating wastewater comprising the steps of introducing a supply of wastewater into a first trickle tower containing biomedia and circulating this wastewater therethrough, the wastewater trickling down the biomedia and becoming partially treated. After a time, passing the wastewater to a second trickle tower containing biomedia and circulating the wastewater therethrough to further treat the partially treated wastewater. Allowing biogrowth to build on the biomedia in said trickle towers, sensing increase in weight of the biomedia in each of the trickle towers due to the increase in biogrowth, and upon the sensed increase in weight of the biomedia in the first trickle tower reaching a predetermined value, switching the sequence of flow of the wastewater through the trickle towers by introducing the supply of wastewater into the second trickle tower for the first partial treatment and then subsequently circulating partially treated wastewater through the first trickle tower.

Subsequent to the increase in weight of the biomedia in the second trickle tower reaching a predetermined value, the sequence of flow of the wastewater through the trickle towers may be switched to introduce the supply of wastewater into the first trickle tower for the first partial treatment thereof.

There may be more than two trickle towers in the sequence of flow of the wastewater through the trickle towers, and the sequence of flow is preferably switched each time the sensed increase in weight of the biomedia in one of the trickle towers reaches a predetermined value.

According to yet another aspect of the invention, there is provided a method of treating wastewater comprising the steps of passing wastewater sequentially through a series of trickle towers, the wastewater to be treated being introduced at one tower and the fully treated wastewater exiting the series at another tower, monitoring the growth of biogrowth in each of the towers, and when the growth of biogrowth in any particular tower reaches a threshold value, switching the sequence in which the wastewater passes through the series of trickle towers to cause the fully treated wastewater to exit the series at this particular tower.

The towers may contain strands of biomedia, and the monitoring comprise suspending at least one of the biomedia strands in each tower via a weight sensitive device sensitive to any increase in weight of the suspended biomedia, the increase in weight indicating the amount of biomass growth. The weight sensitive device may comprise a spring (or any of the devices previously mentioned), the increase in weight of the biomedia portion acting upon the spring or other device and, upon the threshold value being reached, causing actuation of a control system which effects the switching of the sequence.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts:

FIG. 7 is a plan view of the grate of FIG. 6;

FIG. 8 is an end view (partially in section) of the upper structure of the grate in the direction of the arrow 8 in FIG. 7;

FIG. 9 is an exploded view of FIG. 8 additionally showing a portion of a strand of biomedia;

DETAILED DESCRIPTION OF THE PREFERRED EMBODIMENTS

Figure 1:
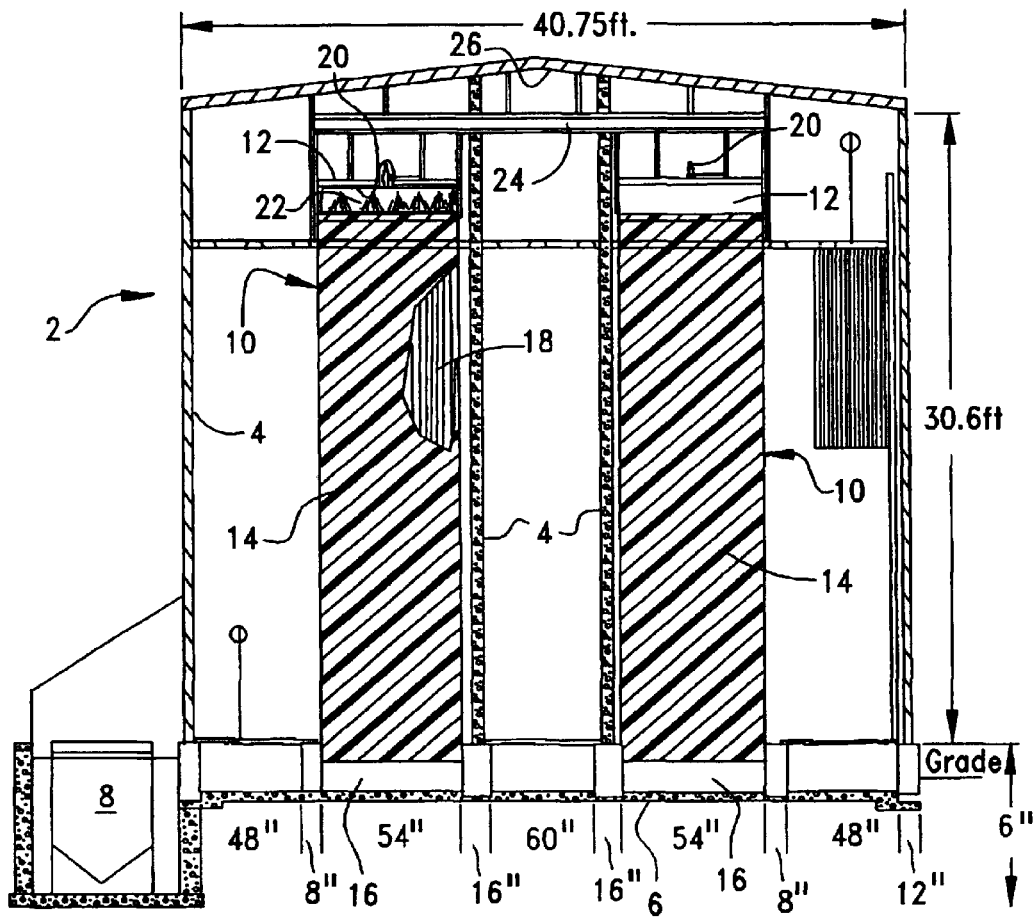
FIG. 1 is a schematic vertical section, looking in a front view direction, of a trickle tower wastewater treatment apparatus embodying the present invention.

FIG. 1 shows an exterior, weatherproof, steel building 2 having a support structure 4 erected on a concrete base 6, with a covered recirculation tank 8 outside the building. Two wastewater treatment cells 10 are shown. Each cell 10 has an upper closure hood 12, with a flexible curtain 14 draped around the hood 12 and extending downwardly into a base receptacle 16 formed on the concrete base 6. Biomedia 18 is enclosed by the curtain 14, and a wastewater discharge system 20 is mounted inside the hood 12 above the biomedia, both as shown through broken away portions of the left cell 10. Wastewater 22 from the discharge system 20 flows down the biomedia 18 and drips into the base receptacle 16, illustrated as a base tray, from which the partially treated wastewater flows to the recirculation tank 8 for recirculation to the system 20 of the same or another cell. Each cell 10 has its own recirculation tank. Of course, each base tray 16 could be constructed as a recirculation tank, so eliminating outside recirculation tanks 8. The hoods 12 are suspended by structural members 24, 26 supported by and forming part of the building structure 4, for example the roof rafters. The curtains 14 are attached and sealed to the outside of the hoods 12, and to the inside of the base receptacles 16. One or more releasable fasteners may extend vertically up and down each curtain for releasably opening and closing the curtain during assembly of the curtain, and for accessing the biomedia within the curtain. The biomedia 18 preferably comprises vertical strands of looped cord biomedia, but may comprise strands in the form of strips of plastic, or may be solid biomedia.

Figure 2:
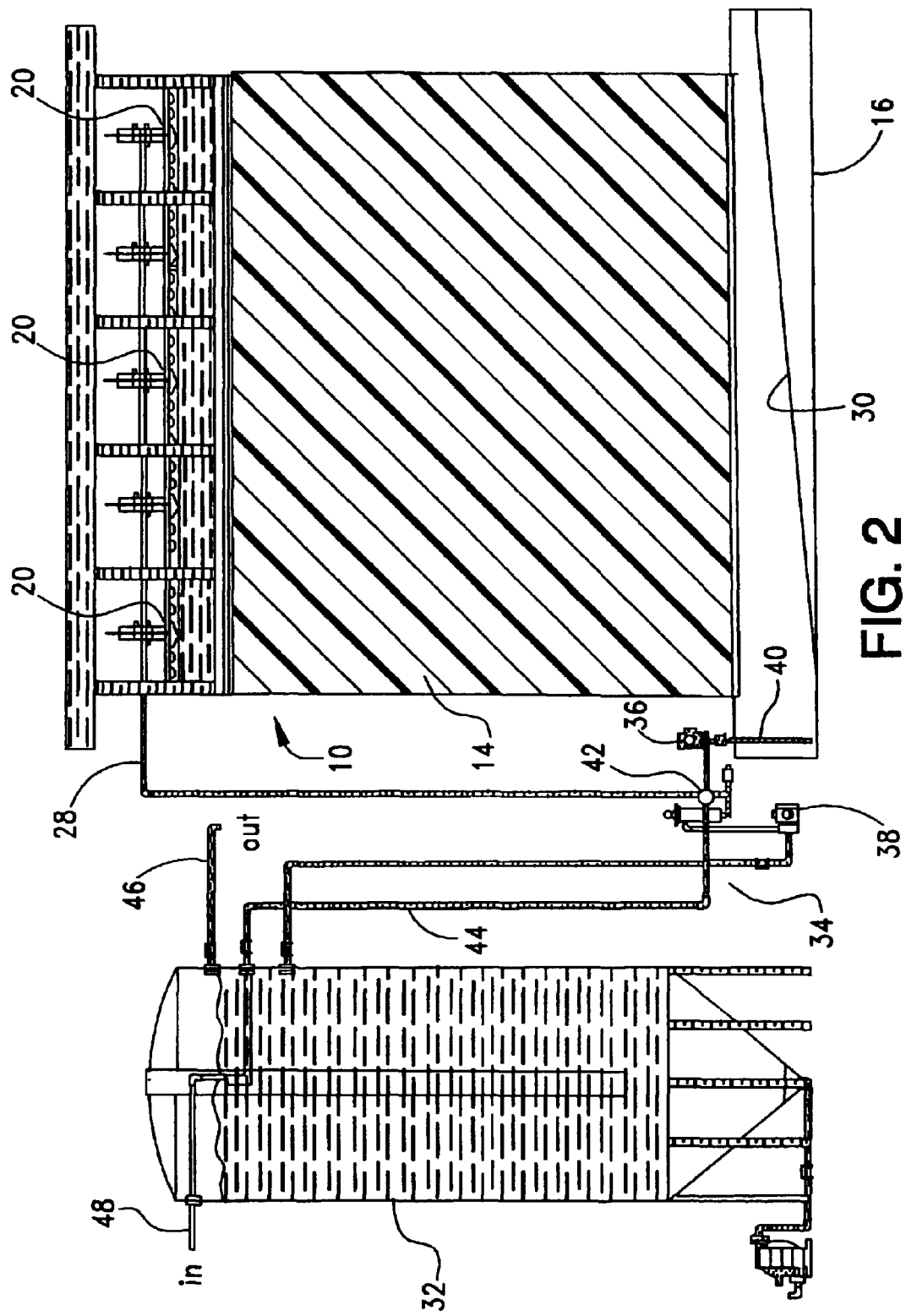
FIG. 2 is a schematic elevational side view, partly in section, of another version of the apparatus of FIG. 1.

FIG. 2 illustrates in side view a variant of the apparatus of FIG. 1 and shows an elongate treatment cell 10 surrounded by a curtain 14. At the top of this cell 10 are five wastewater spray units 20 fed by a common supply pipe 28. An elongate base receptacle 16, with a downwardly inclined floor 30, communicates with an external free-standing recirculation tank 32 via pipes 34 and pumps 36, 38, which effect recirculation of the wastewater through the cell 10. The pump 36 draws partially treated wastewater from the base tray 16 via a suction pipe 40. A valve 42 directs the wastewater to the common supply pipe 28 for recirculation through the cell 10. Excess wastewater is directed by the valve 42 to the recirculation tank 32 via pipe 44. Excess wastewater spilling out of the tank 32 is directed by a continuation (not shown) of the outlet pipe 46 back to the base tray 16. The pump 38 can be used for initial priming of the system and, if necessary, to supplement the pump 36. Initial entry of untreated wastewater, or partially treated wastewater from another trickle tower of the apparatus, enters the tank 32 via inlet pipe 48.

Figure 3:
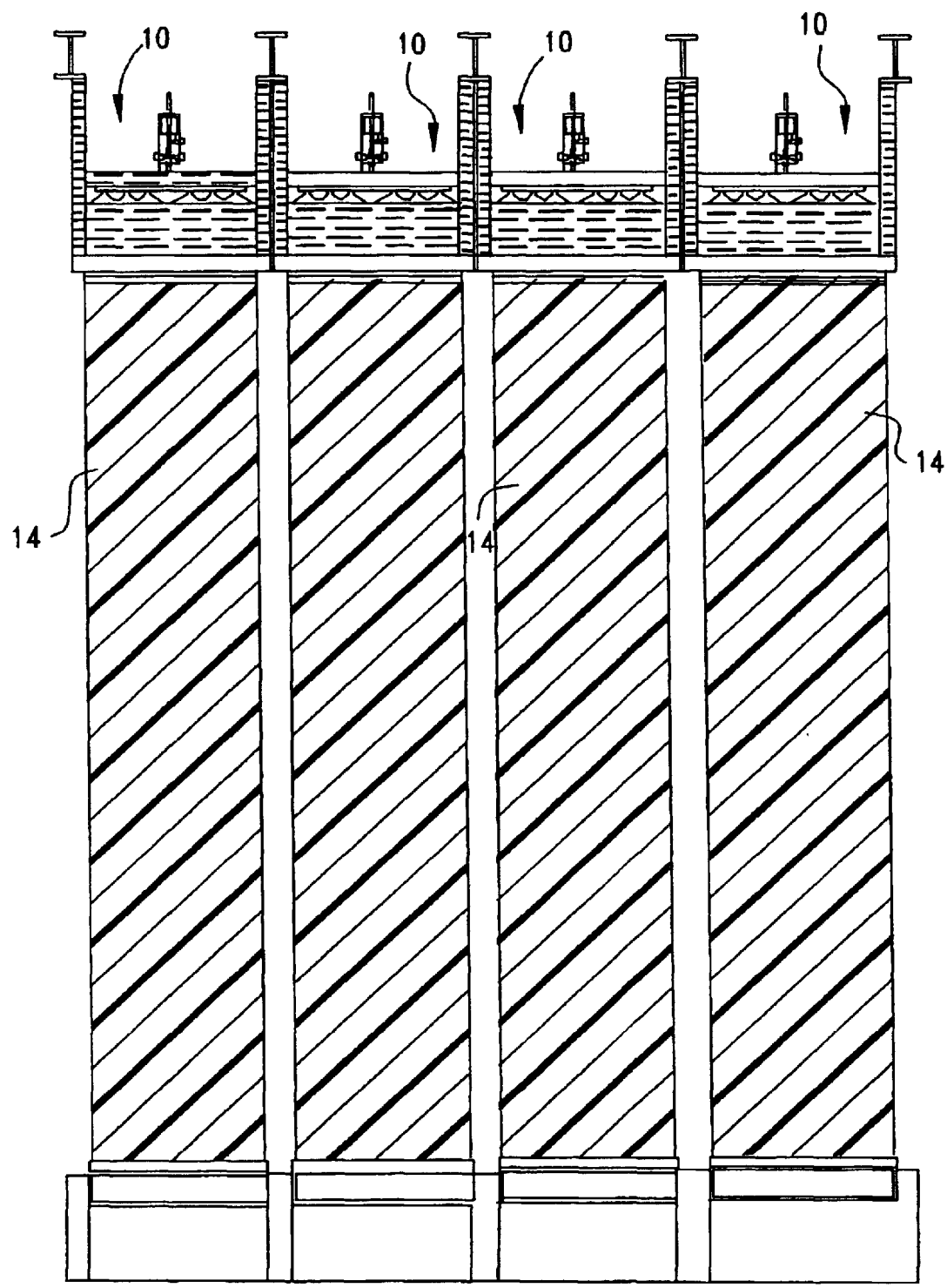
FIG. 3 is schematic front view of the apparatus of FIG. 2 in a similar direction to the view in FIG. 1.

FIG. 3 is a front view of the apparatus of FIG. 2, and shows four similar treatment cells 10 side by side. Each of these cells 10, and the biomedia therein, is surrounded and contained by a separate curtain 14. By viewing FIG. 3 in conjunction with FIG. 2, it will be realized that each cell 10 has an elongated rectangular horizontal cross-section. FIG. 3 is a similar view to the two cells 10 in FIG. 1, and the four cells 10 in FIG. 3 are housed in a building similar to that shown in FIG. 1.

Figure 4:
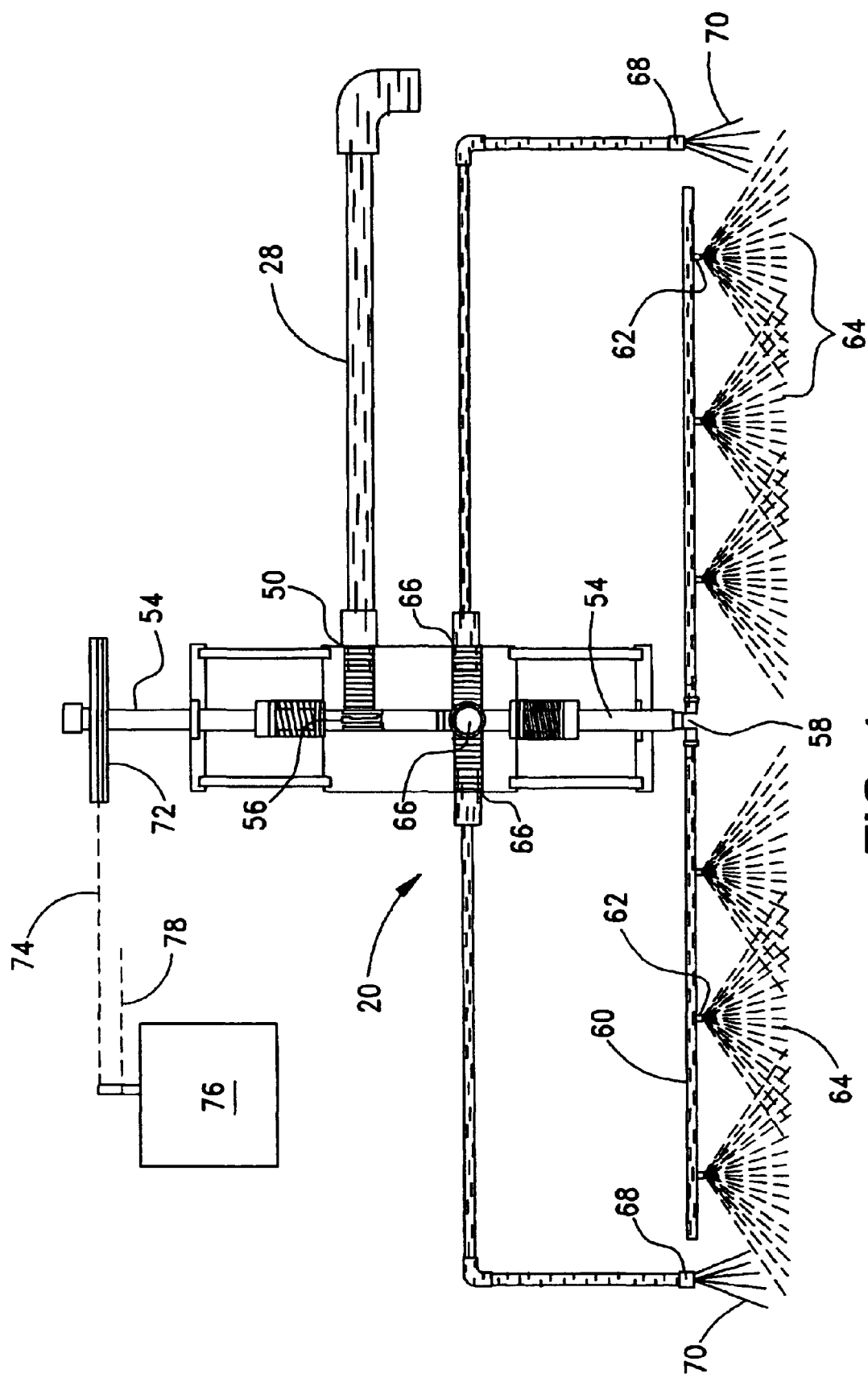
FIG. 4 is a diagrammatic elevational view, partly in section, of a wastewater spraying system employed in the apparatuses of FIGS. 1 and 2.

When the horizontal cross-section of a cell is circular, a rotating spray device, such as shown and described in previously referenced U.S. Pat. No. 6,241,889, would be satisfactory. However, with non-circular horizontal cross-sections, for instance square, oval, and rectangular cross-sections, a circular spray pattern may leave corner and/or end or other sections starved of sprayed wastewater. To overcome this, stationary spray nozzles may additionally be placed in the corners, or any other area missed by the circular spray pattern. These stationary nozzles preferably should be given a pulsing action to provide the sprayed biomedia with an opportunity to receive alternately wastewater and air. This pulsing can be achieved using power-operated on/off valves, intermittent pumping, injectors, or an intermittent flow diversion system. A preferred way of achieving this pulsing is illustrated in FIG. 4. Alternatively, an oscillating spray or discharge system could be employed, preferably oscillating about a horizontal axis extending across the cross-section of the biomedia. This can be achieved with a cascade system comprising a horizontal oscillating manifold having a longitudinal slot nozzle that cascades a sheet of wastewater intermittently as the manifold oscillates. Although less preferable, instead of using rotating or oscillating sprays, all stationary intermittent sprays could be employed.

FIG. 4 is a front view, partly in section, of the wastewater spraying units 20 shown in FIGS. 1, 2, and 3. A branch of the wastewater feed pipe 28 is connected to an inlet port 50 in a body of the spray unit 20, and communicating with an inlet in a rotating vertical pipe 54. This inlet is formed by a series of vertical slots 56 all around the wall of the rotating pipe 54, so providing continuous communication between the pipes 28 and 54. The rotating pipe communicates at its lower end, via a T-junction 58, with the center of the rotating spray arm 60. This rotating arm is schematically shown as having three nozzle orifices 62 on each side of the vertical rotational axis, providing six jets of spray 64; the total number of nozzle orifices could be two, four, six, eight, or more, depending on the size of the trickle tower cell and the character of the wastewater being treated. Between the feed pipe 28 and the spray bar 60, the rotating pipe 54 has a circular outlet orifice that sequentially communicates with four pulse nozzle outlets 66 (only three of which can be seen). These outlets 66 supply four stationary nozzles 68 (only two of which can be seen) with intermittent pulses of wastewater. The jets of spray 70, which are sequentially ejected downwardly from the stationary nozzles 68, impinge upon an area of the biomedia below that is either not covered, or not fully covered, by the sprays 64 issuing from the rotating spray arm 60. At the upper end of the shaft is mounted a pulley 72 connected, by a belt or chain 74, to a drive motor 76 mounted on the hood or a beam of the support structure. Schematically shown at 78 is another drive from the motor 76 for simultaneously driving a second, or more, similar wastewater discharge units. The five systems 20 shown in FIG. 2 (being in a single cell) would be connected together by belts, or chains, or similar transmission, and driven by the single motor 76.

Also, in all of the above pulsing arrangements, instead of the pulse jets 70 issuing in a progressive sequence, they may issue in any suitable sequence or, if particular circumstances required it, they could all issue at the same time.

Figure 5:
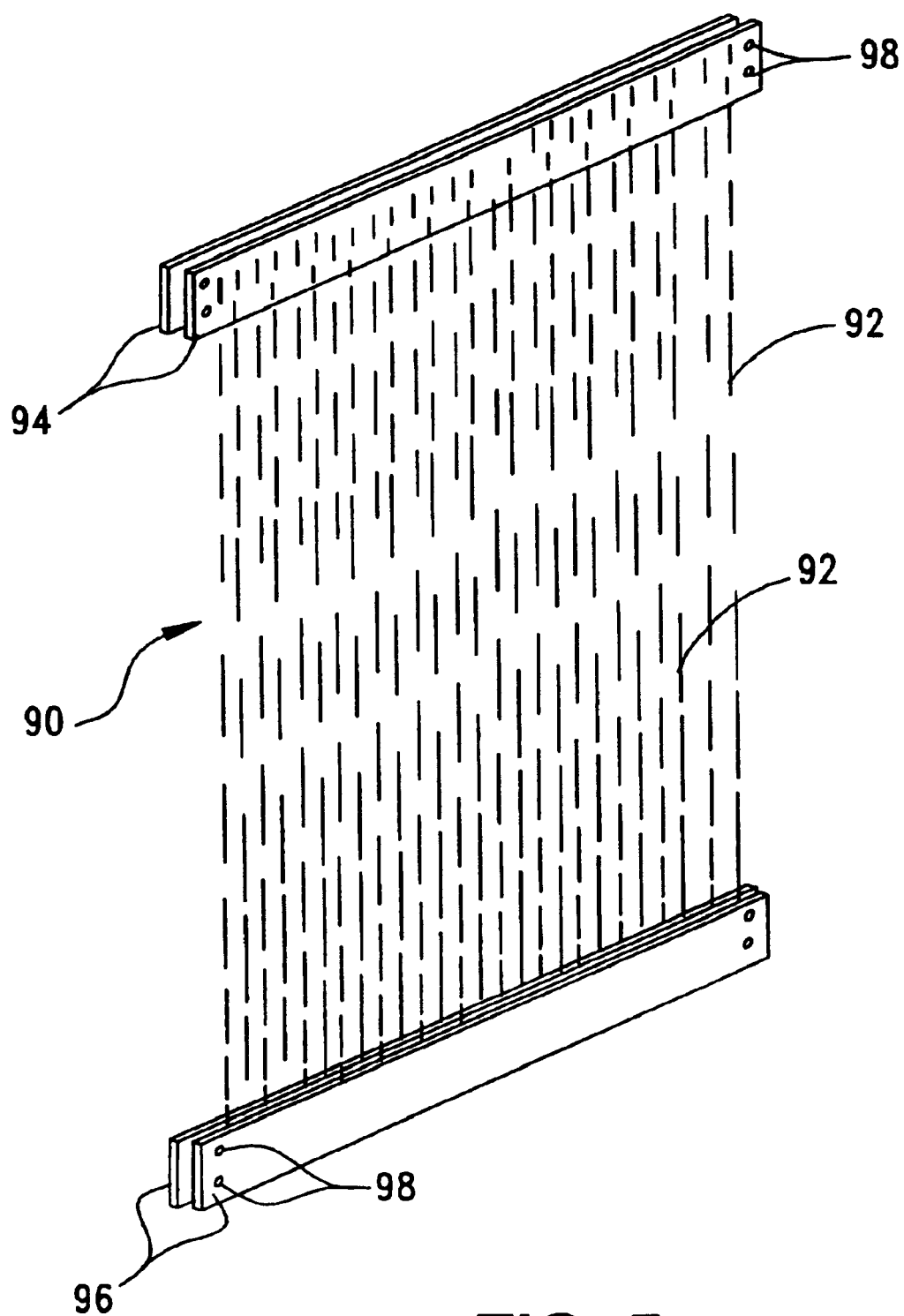
FIG. 5 is a diagrammatic perspective view of a biomedia hanger frame.

FIG. 5 illustrates a frame or hanger 90 of looped cord biomedia. The hanger frame 90 has a plurality of discrete lengths 92 of looped cord biomedia extending between upper and lower pairs 94, 96 of hanger bars. The ends of the looped cord 92 are clamped between the respective pairs of bars. The pairs of bars are secured together by gluing, although this could be done by spot welding, the bars preferably being made of plastic material, for example ABS. Each end of each pair of bars has a pair of vertically spaced-apart holes 98 for assembling a plurality of hangers together. When the pairs 94, 96 of bars are stretched apart, the lengths 92 of looped cord are spaced apart parallel to each other. The ends of the lengths of looped cord may be cut off flush with the adjacent pair of clamping bars, or may extend just beyond the bars. In the latter case, these extending ends may be heat-treated to cause them to fuse and form enlarged ends, to retain more securely the ends from pulling through between the pair of clamping bars.

These hangers are preferably manufactured as a series of links connected together and rolled up into a somewhat cylindrical roll. This is done by forming a warp of strands of looped cord biomedia and clamping a pair of hanger bars across this warp. The warp is then advanced the desired length for the hanger, and another pair of hanger bars clamped across the warp. Thereafter, the warp is advanced a short distance (e.g. 1 to 4 inches) and another pair of hanger bars (to form the beginning of the next hanger) clamped across the warp. This process continues with the hangers being reeled onto a spool as further hangers are formed. Individual hangers can be then cut from the spool as required. If the cutting is performed by a hot-air knife, the cut ends of the looped cord biomedia fuse as mentioned above.

The looped cord biomedia is preferably made from knitted polyester or PVDC yarns. If the knitted structure enables the loops to be orientated in one axial direction, then in the grate, all such loops should be orientated in the same direction. This is enabled by having discrete cut lengths of biomedia formed from a warp. When assembled in the trickle tower, all such loops would be orientated upwards.

Figure 6:
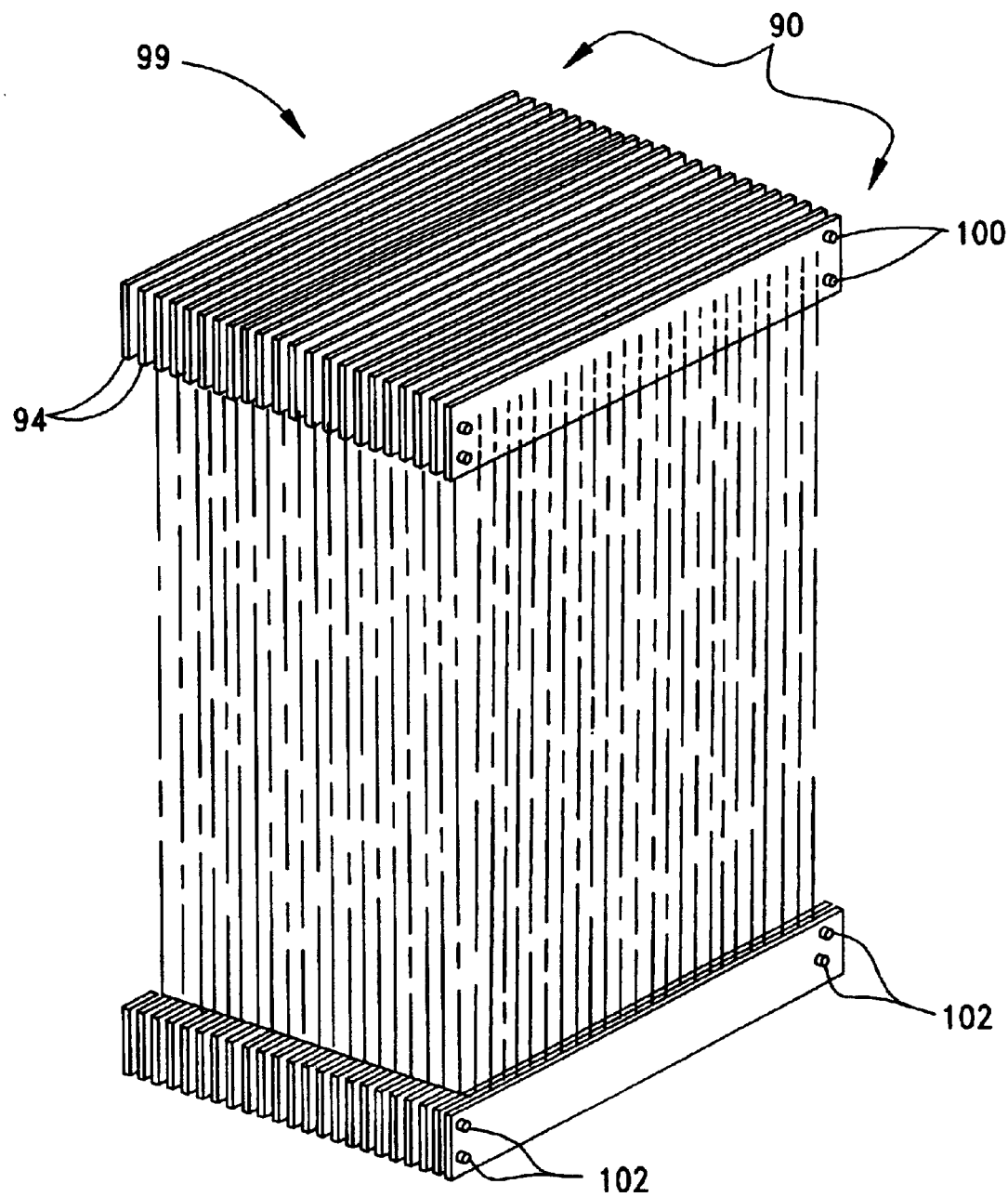
FIG. 6 is a diagrammatic simplified perspective view of a biomedia grate made up of a plurality of the hanger frames of FIG. 5, and employed in the apparatuses of FIGS. 1, 2, and 3.

FIG. 6 shows a plurality of hanger frames 90 connected together to form a grate 99. The upper pairs of hanger clamping bars 94 are rigidly bolted together by a pair of bolts 100 at each end through the holes previously mentioned. The lower pairs of hanger clamping bars 96 are similarly rigidly bolted together by bolts 102. Spacers keep the pairs of bars correctly spaced apart.

FIG. 7 shows in plan view the top of the grate 99, although the pairs 94 of hanger bars are relatively longer than in FIG. 6. Eleven pairs of hanger bars are equally space apart by spacers 104 cut from square aluminum tubing. With this longer grate 99, five pairs 100 of equally spaced-apart bolts pass through the bars and the spacers. In this way, the upper pairs 94 of bars are rigidly secured together; the lower pairs of bars of this grate 99 are similarly rigidly secured together.

FIG. 8 is an end view (mostly in vertical section) of the upper hanger bars of the grate in the direction of the arrow 8 in FIG. 7 (the lower hanger bars would look the same). The connecting and securing bolts 100 are tightened by their nuts 106 at the right end in FIG. 8. The hollow spacer tubes 104 extend vertically between the pairs of clamping bars for the full height thereof. FIG. 9 is an exploded view of FIG. 8, but also showing a strand 18 of looped cord biomedia clamped between the right outermost pair of clamping bars and extending downwardly therefrom; the upper cut end 108 of the strand 18 can be seen extending slightly above the hanger bars. Although the strands of biomedia are clamped between the pairs of clamping bars before these are assembled into a grate, the subsequent tightening of the grate bolts 100 further aids the securing of the biomedia ends. This improves the integrity of the grate 99, and enables the biomedia strands to be able to carry heavier weights of biomass, during operation when purifying wastewater, because the biomass loaded strands further resist any tendency to pull through the upper clamping bars.

Figure 10:
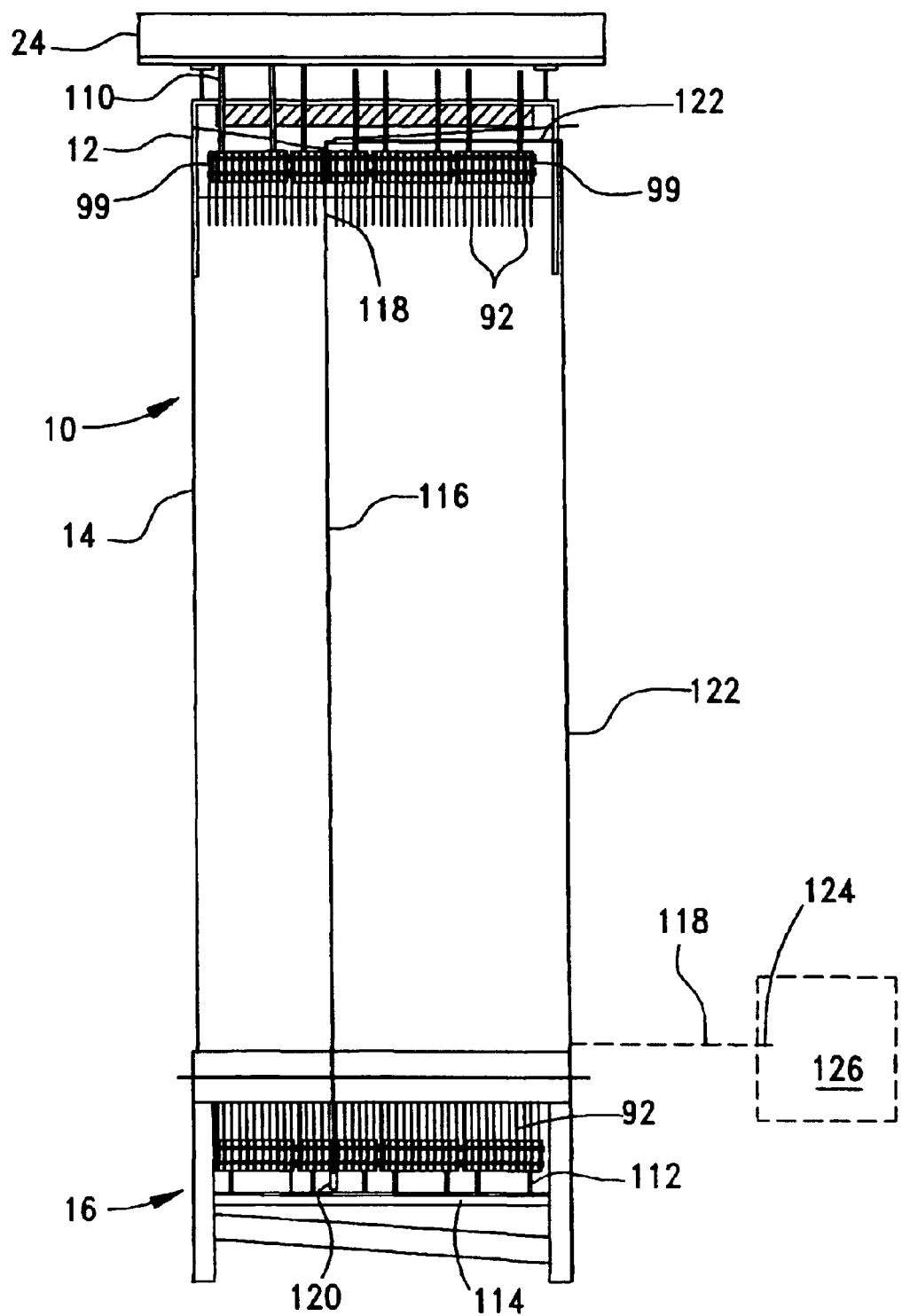
FIG. 10 is a simplified elevational view, partly in section, of a cell of a trickle tower illustrating a first biogrowth sensing embodiment according to the invention.

FIG. 10 shows a trickle tower 10 (with some parts omitted for clarity) having at the top a hood 12 suspended from a beam 24 of a support structure (such as in FIG. 1), a base receptacle 16 at the bottom, and a flexible curtain 14 extending from around the hood down to inside the base receptacle. Four grates 99 of looped cord biomedia are suspended from the hood 12 by tensioning bolts 110, the bottoms of these grates being anchored by further tensioning bolts 112 to one or more bars 114 extending across the base receptacle 16. The vertical, spaced-apart, parallel strands 92 of looped cord biomedia 18 are tensioned by adjusting the tensioning bolts 110, 112 at the top and/or bottom. The bottom bolts 112 are a sliding fit, i.e. a slip fit, through the anchoring bar(s) 114, this allowing the biogrowth-loaded strands 92 to lengthen downwards as the biogrowth gets heavier. An individual strand 116 of looped cord biomedia extends down through the trickle tower cell 10 between the strands 92 of one of the grates 99; this strand 116 is suspended at the top from a cable 118, and is weighted at the bottom by a free hanging weight 120. The weight preferably places this individual strand 116 under approximately the same tension as the tensioned strands 92 of the four grates. This weight 120 may be guided in a guide tube to help more accurately locate the individual strand and minimize the risk of it touching adjacent strands. The cable 118 passes through a thin 122 extending across the top of the cell above the grates 99, and then down the outside of the curtain 14 to adjacent the bottom thereof The free end 124 of the cable 118 is anchored in, or to or through, a sensing device 126 (shown schematically) for sensing change in weight due to increase in biogrowth. This is done by sensing movement and converting such movement into a signal, or by actuating an electrical device, such as a switch. When the weighted individual strand 116 has moved the end 124 of the cable 118 a predetermined distance, indicative of the amount of biogrowth on the strand 116, a visual, audible, electrical, and/or mechanical signal is produced. With a single trickle tower installation, this signal provides a warning that the biomedia is loaded with biogrowth, and requires cleaning or changing. With a multi-tower installation, this signal can give a similar warning, and/or can effect valve changes to alter the path of flow of the wastewater through the trickle towers, as will be described later. The warning signal can be a light, e.g. a flashing lamp, a buzzer, a klaxon, or a mechanical signal device, and/or may make an entry in a computer monitoring system. The sensing device can be an induction coil, a potentiometer, a variable resistance, a variable condenser, or a switch, etc. having a movable component and a stationary part. The relationship between the movement of the individual strand 116 and cable 118, or the increase in tension thereof, and the amount of biogrowth on the strand 116, is determined experimentally, and the sensing device 126 calibrated accordingly. Although, preferably, the movement of the end 124 of the cable 118 outside the particular trickle tower cell is utilized, the downward movement of the weight 120 inside the trickle tower or the increase in tension of the strand 116 or cable 118 could be utilized to produce the warning signal or effect any valve changes.

Figure 11:
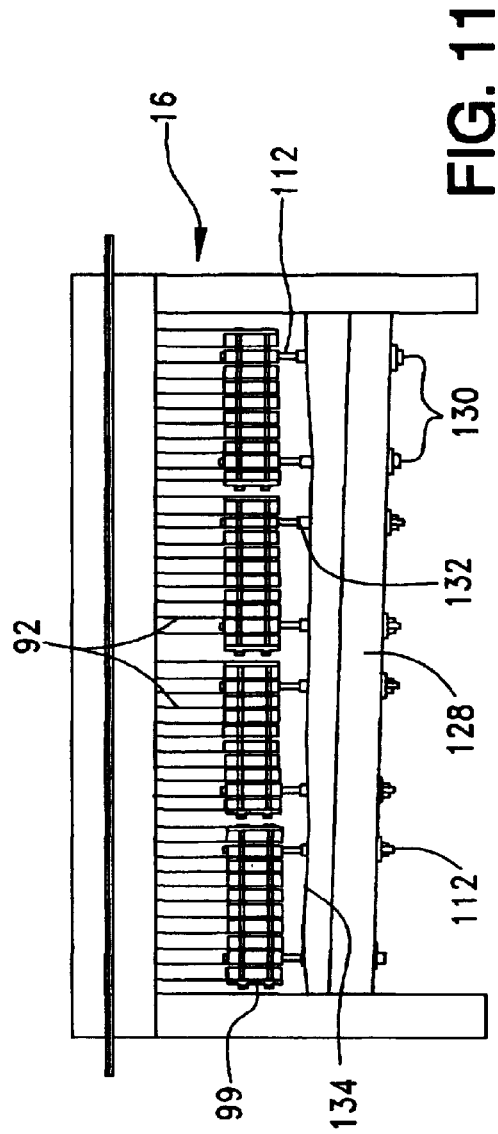
FIG. 11 illustrates a modification of the base receptacle of the trickle tower of FIG. 10 with a side wall of the base receptacle omitted.

FIG. 11 illustrates a modification to the anchoring of the bottom of the grates 99. Instead of anchoring the grates inside the base tank 16, the tensioning bolts 112 pass through the bottom 128 of the tank, and are tensioned by nuts 130 outside the tank 16. To enable the tensioning bolts 112 to freely pass through the tank bottom 128 as the biogrowth-loaded strands 92 lengthen, tubes 132 sealably extend through the tank bottom and extend upwardly to above the wastewater level 134 in the tank. The tensioning bolts 112 are a slip fit in these tubes 132. The weighted strand 116 in FIG. 10 could have an extension that similarly passes through a tube in the bottom of the tank, the weight then being outside the tank.

Figure 12:
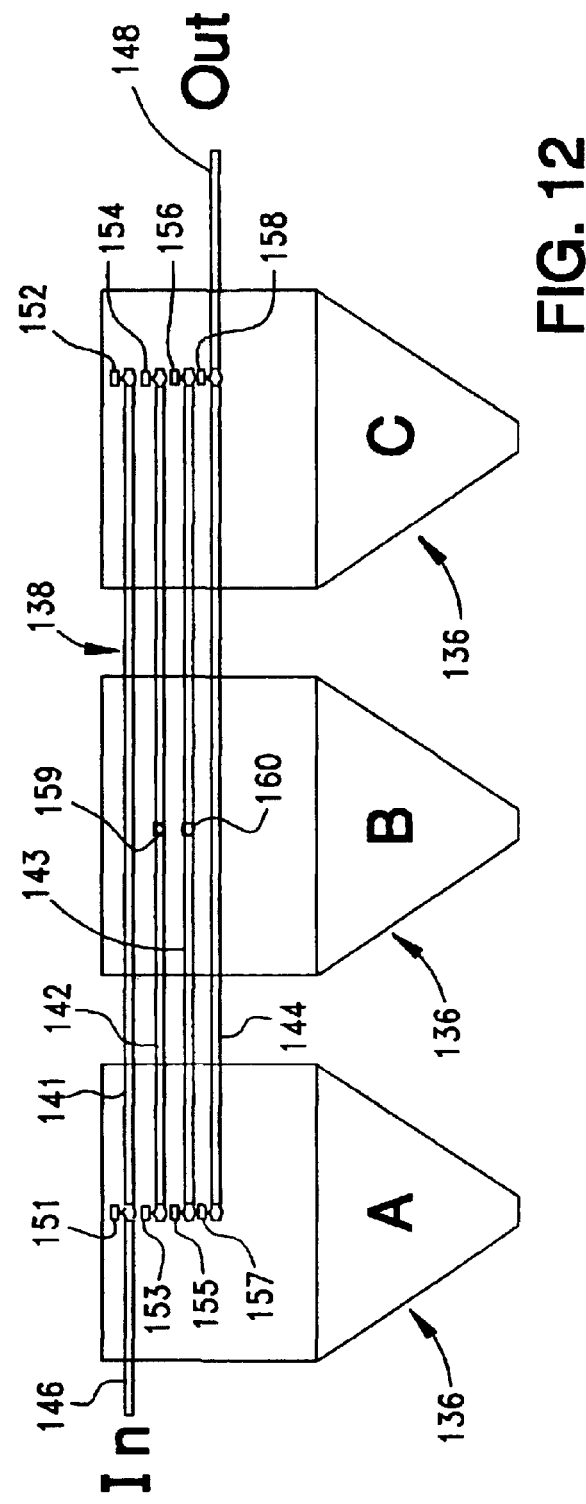
FIG. 12 is a diagrammatic elevational representation of the base tanks and an interconnecting manifold for grooming biogrowth according to another embodiment of the invention in a three trickle tower system.

FIG. 12 represents a multi-tower system having three wastewater trickle towers interconnected at their recirculation base tanks 136 by a manifold 138. The three towers are labeled A, B, and C, only the base tanks 136 of these towers being shown. The manifold comprises four pipes 141, 142, 143, 144 interconnectable in various sequences between the recirculation tanks 136 of the three towers. The four pipes 141 to 144 are schematically shown parallel and one above the other. Wastewater enters the system through the left end 146 of the upper pipe 141, and the fully treated wastewater exits the system through the right end 148 of the lowest pipe 144. All four pipes are connected by valves 151, 153, 155, 157 to the trickle tower A, and all four pipes are connected by valves 152, 154, 156, 158 to the tower C. Additionally, the middle two pipes 142, 43 are connected by open connections 159, 160 to the middle tower B. The wastewater always enters the system at the left end inlet 146 of the upper pipe 141, and exits the system at the right end outlet 148 of the bottom pipe 144; in-between, the wastewater passes through the towers A, B, C in different sequences depending upon the settings of the valves, as will more readily be understood with reference to FIG. 13.

Figure 13:
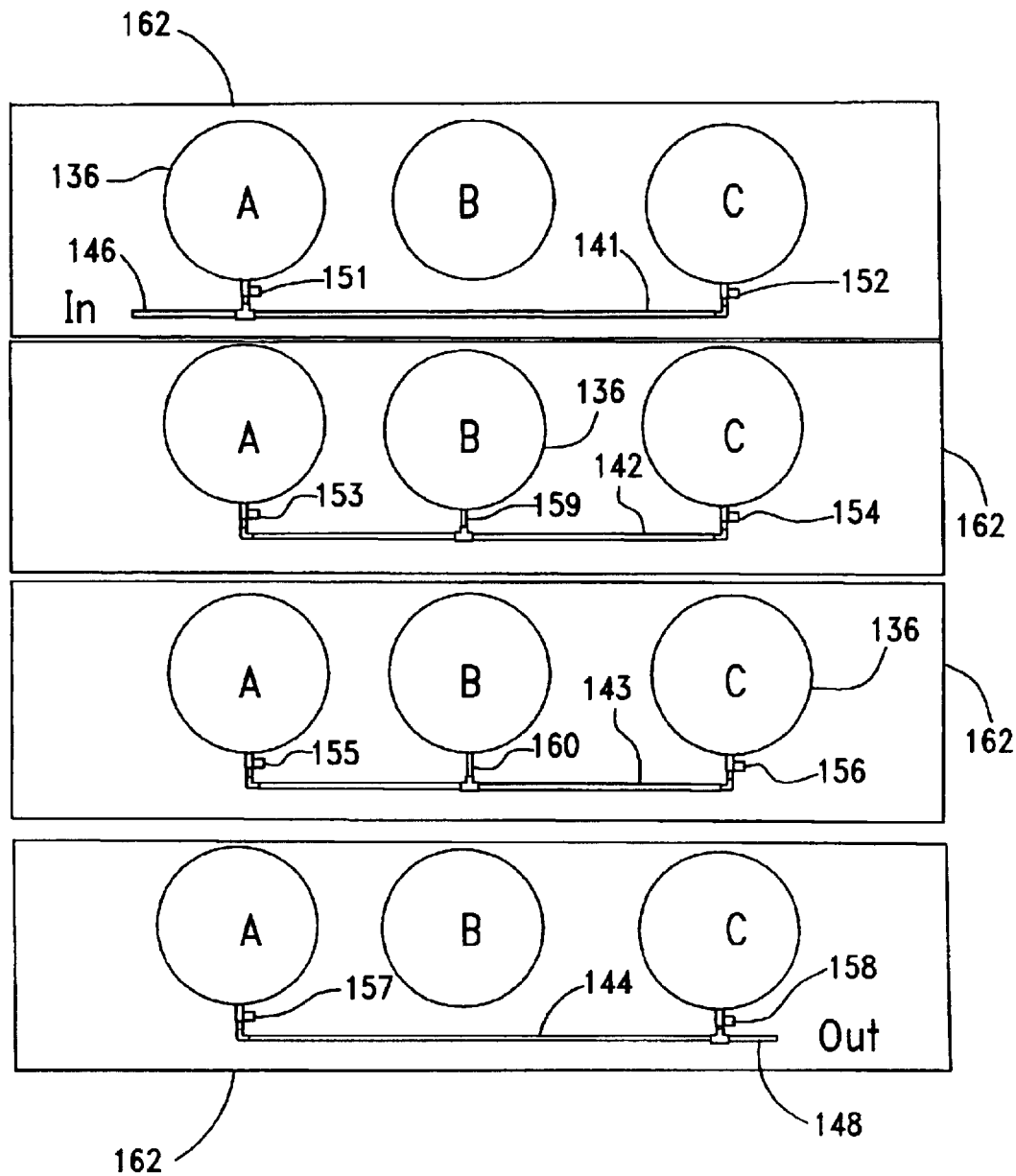
FIG. 13 is a diagrammatic expanded plan view of the base tanks and manifold of FIG. 12.

FIG. 13 schematically shows, in expanded plan view, the connections of each pipe 141, 142, 143, 144 of the manifold 138 to the recirculation tanks 136 of the trickle towers A, B, and C. The block 162 represents an outer support structure, e.g. a weatherproof building, surrounding the three trickle towers. As explained with FIG. 12, the wastewater enters the system at 146 and exits the system at 148. In between, the wastewater is recirculated many times through each of the trickle towers A, B, and C; the partially treated wastewater after being so treated in one of the trickle towers, then passing to a second of the towers for recirculation therein, and then finally passing to the third of the towers for further recirculation therein before exiting at 148. The sequence of passage through the towers is first in the order A, B, C. Then as the amount of biogrowth on the biomedia in the first tower A grows and reaches an amount that starts to seriously decrease the efficiency of processing the wastewater, the sequence is changed to the order C, B, A. This sequence is continued until the biogrowth in tower C reaches an undesirable amount, and at that stage the sequence is changed back to A, B, C. This changing of the sequence continues to repeat each time the biogrowth, in which ever is the then leading tower (i.e. where the untreated wastewater initially enters the system), reaches an undesirable amount of biomass.

For the sequence A-B-C, the valves 151, 153, 156, 158 are open, as are connections 159,160; and valves 152, 154, 155, 157 are closed. For the sequence C-B-A, valves 152, 154, 155, 157 are open (as are connections 159, 160), and valves 151, 153, 156, 158 are closed.

The biogrowth grows (or increases) at the fastest rate in the first tower entered by the wastewater. The second tower entered is treating already partially treated wastewater, and has a slower rate of growth of biogrowth. The last tower entered is treating moderately pure wastewater, and consequently has a relatively low rate of growth of biogrowth. By switching the initial intake of wastewater from the first tower to the last tower, the first tower now receives moderately pure wastewater which does not have sufficient "food" to feed the microorganisms on its biomedia. Consequently, atrophy occurs and the biomass starts decreasing in the first tower. At the same time, the rate of growth of biomass increases in the last tower as this is now handling untreated wastewater containing a full supply of "food". The middle tower remains the second in the treatment sequence, and continues to have only a moderate amount of biomass growth. With this sequencing, the wastewater system can be run for an extended period of time, e.g. several months or possibly even a year (depending on the content of the wastewater), before needing attention to the state of the biomedia.

In stead of always leaving the tower B as the second in the sequence, valves could be placed between the four manifold pipes 141, 142, 143, and 144 and the middle tower B, and then the sequencing would be: A-B-C; B-C-A; C-A-B before returning to A-B-C etc. Such complete rotation in the sequencing would extend further the time between cleaning or replacing the biomedia. When there are four or more trickle towers, it is preferable to employ complete rotation in the sequencing, so that each tower takes its turn at being last in the sequence.

When changing the sequence through the towers of a multi-tower system, the various valves (or movable pipe connections) can be changed manually or automatically. When manual changing is employed, preferably there is an arrangement for sensing biomass growth, e.g. as in FIG. 10, and a warning signal of some type triggered. On the other hand, the manual changeover could be based on a predetermined time cycle, or on physical inspection of the state of the biomedia in the lead trickle tower.

FIGS. 14 to 18 illustrate another approach to sensing the growth of biomass on the biomedia 18. In this approach, one or more biomedia grates in a trickle tower are sensed for change in weight. The trickle tower is similar to those shown in FIGS. 1, 2, and 10, and preferably employs grates with looped cord biomedia, although any other type of biomedia, such as strips of plastic, strips of cloth, etc., could be used. Several of these trickle towers may be connected together by a manifold arrangement along the lines of that described with reference to FIGS. 12 and 13, and manual or automatic sequence changing employed.

Figure 14:
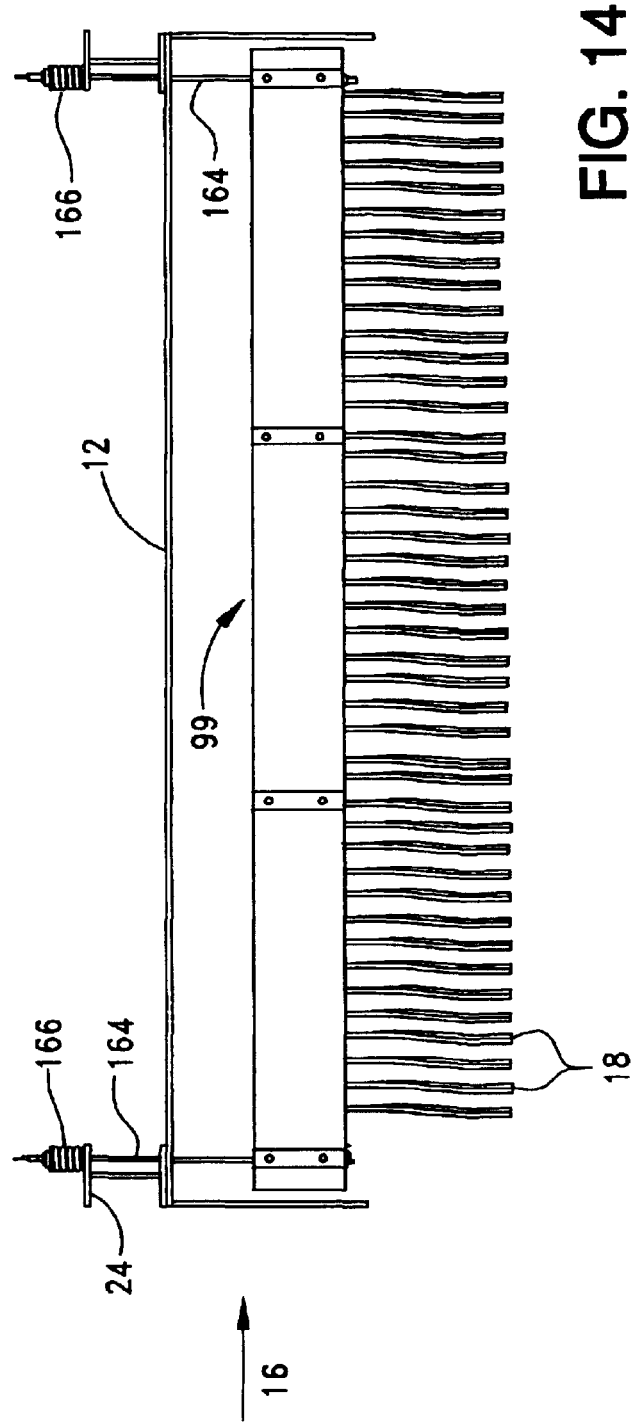
FIG. 14 is an elevational view, partly in section, of an upper portion of a trickle tower showing a second biogrowth sensing embodiment according to the invention.

FIG. 14 shows a biomedia grate 99 suspended by suspension bolts 164 on each side and which pass upwardly with a slip fit through the hood 12 of the cell and structural members 24 supporting the hood. The bolts 164 are supported on the structural members 24 by coil springs 166 through which they freely pass. An upper washer and adjustable nut stop each bolt from pulling downwards through its spring. The weight of the biomedia grate 99 causes the springs 166 to compress to a certain extent. As the weight of biogrowth on the biomedia 18 increases, the springs further compress so causing the bolts 164 to move progressively downwards.

Figure 15:
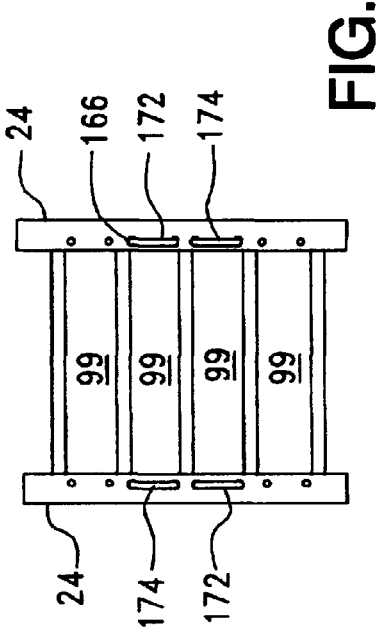
FIG. 15 is a diagrammatic plan view of the embodiment of FIG. 14.

FIG. 15 shows in plan view four grates 99 making up the cell. The middle two grates are suspended on each side by a pair of springs 166. A bar 172 is interconnected between each pair of springs, and a switch trigger 174 is mounted at the center of this bar. Thus, the middle two grates are spring mounted and between them carry four switch triggers 174. This arrangement provides a balance between economy and weight change sensitivity. However, any number of grates 99 could be so supported from one to all four; and a switch trigger could be located at only one side of a grate.

Figure 18:
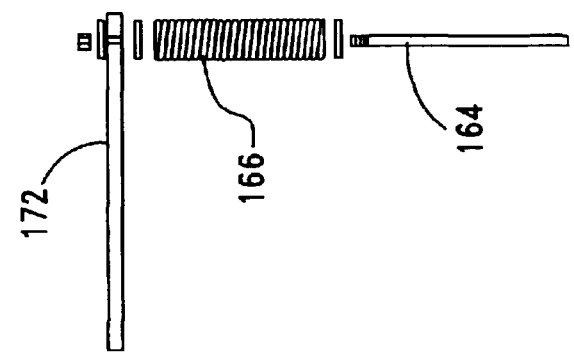
FIG. 18 is an enlarged exploded view from the rectangular portion 18 in FIG. 16.
Figure 17:
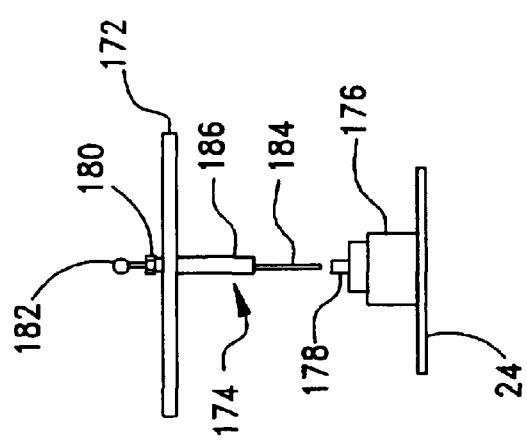
FIG. 17 is an enlarged view of the circled portion 17 of FIG. 16.
Figure 16:
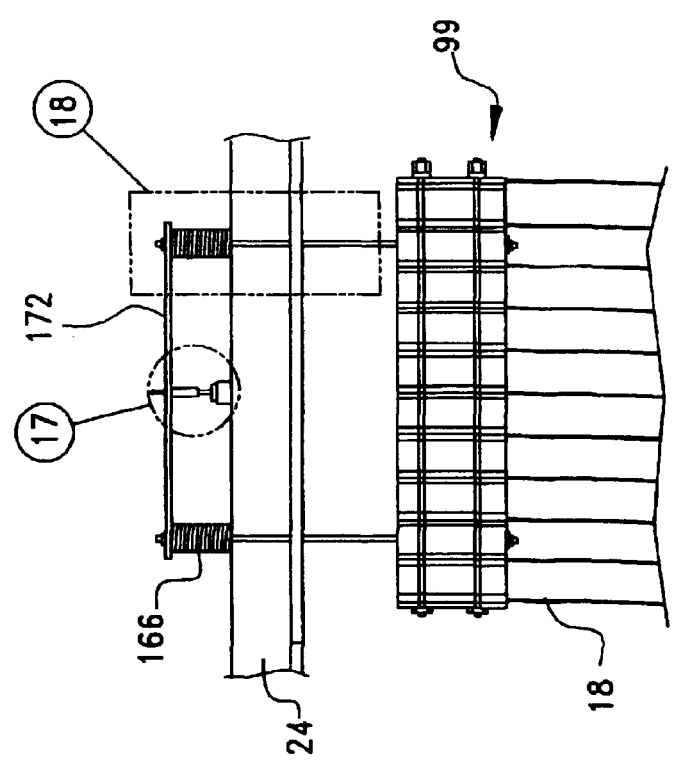
FIG. 16 is a simplified view in the direction of the arrow 16 in FIG. 14.

FIG. 16 shows an upper portion of one grate 99 in the direction of the arrow 16 in FIG. 14. The switch trigger can be more clearly seen intermediate the length of the bar 172. On the structural member 24, immediately below the switch trigger, is a switch body that is actuated by the trigger. FIG. 17 shows the detail within the circle 17 in FIG. 16, and more clearly shows the switch trigger 174 and its spacing above an actuating plunger 178 protruding from the switch body 176. A locking nut 180 locks any adjustment made with an adjusting knob 182 on a screw-threaded stud 184 threadedly engaged in an elongate nut 186 fixed to the bar 172. FIG. 18 shows the detail within the box 18 in FIG. 16, and is an exploded view of the spring and bolt assembly.

As the biomass weight builds on the biomedia strands of the grates, the increasing weight of the grates steadily compresses the springs until one or more of the switch triggers descend sufficiently to actuate one or more of the switches. Actuation of at least one of the switches 176 in the trickle tower causes a warning signal to be given, and/or effects automatic actuation of the valves in a manifold, interconnecting a plurality of trickle towers, to change the sequence of flow of the wastewater through the series of towers. The amount of biogrowth that occurs before one of the switches is triggered can be controlled by adjusting the adjusting knobs 182 of the triggers 174. The switch is a simple on/off type, but this could be replaced by a variable type of switch, such as a potentiometer, a rheostat, an induction coil, etc., for progressive weight measurement. Although it is preferred to have the springs and triggers adjacent the top of each trickle tower, so reducing exposure to and contamination by wastewater, they could be located adjacent the bottom of the towers and function in relationship with the lower bars of the grates. In another form, actuating members may slidably pass through the bottom of the base receptacle, such as through the tubes 132 in FIG. 11; these actuating members could be attached to the lower bars of the grates and be moved downwards by a lengthening of the biomedia strands due to increase in biomass thereon.

Figure 19:
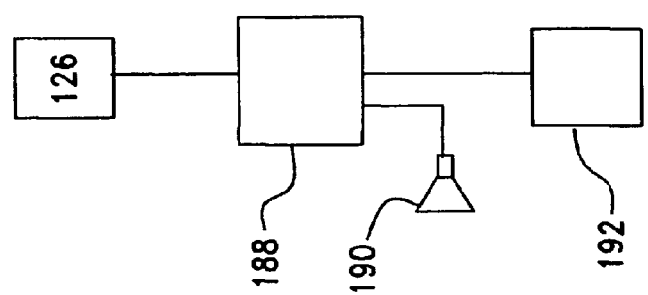
FIG. 19 is an electrical schematic of a warning system of the biomass sensing arrangement of the embodiment of FIG. 10.

FIG. 19 illustrates the sensing device 126, of the embodiment of FIG. 10, connected to a control panel 188 which in turn has separate outputs to an audible alarm device 190 and a display monitor 192 of a computer. The computer may be used for infeeding information into the control panel 188. When the sensing device 126 indicates a predetermined increase in weight of the biomedia strand 116 (FIG. 10), the audible alarm 190 sounds. The monitor 192 shows a visual warning. If the sensing device 126 gives a progressive output signal indicative of the changing weight of the sensed strand 116, then the monitor 192 can give a continuing indication of the state of the biomedia in the trickle tower.

Figure 20:
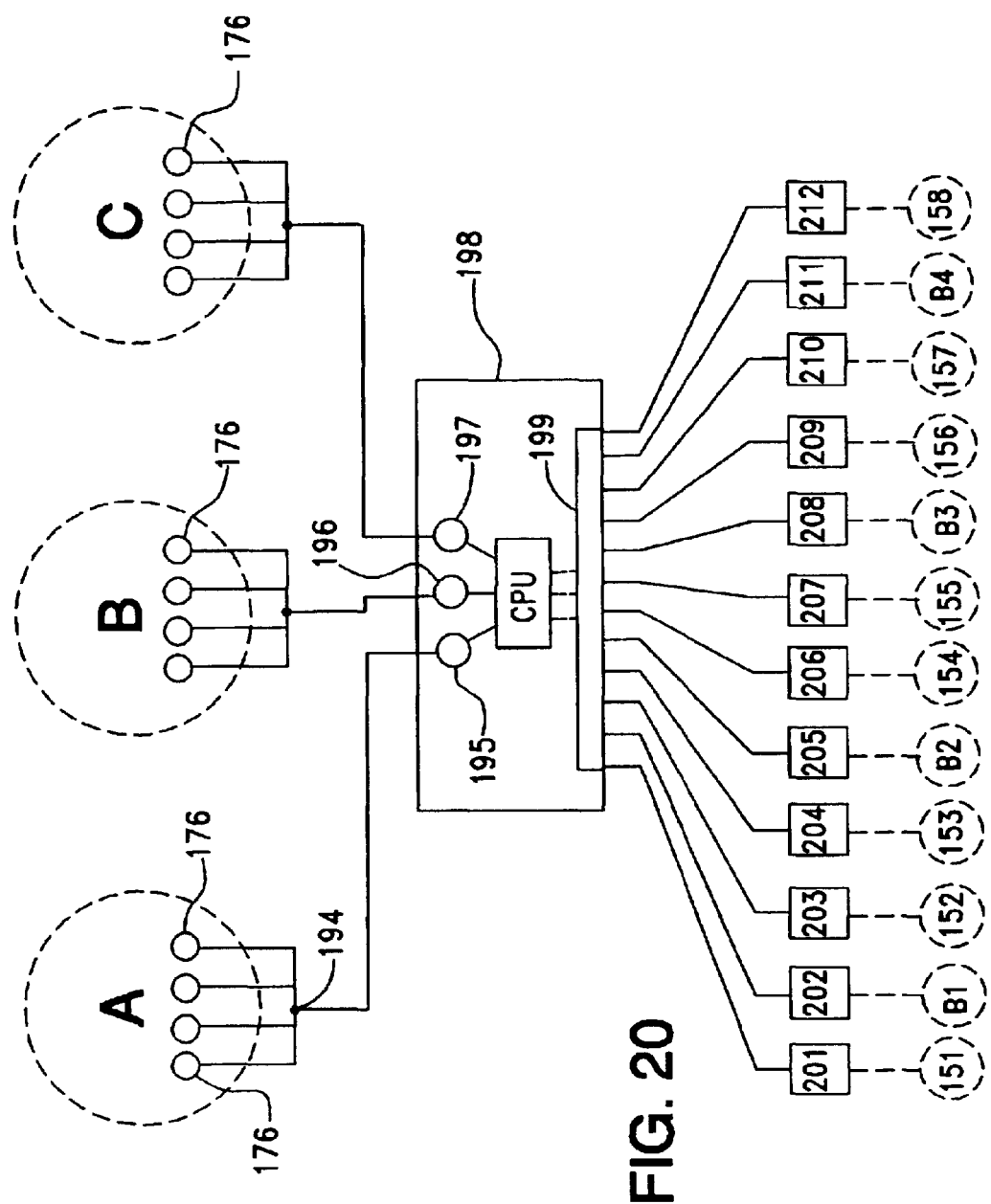
FIG. 20 is an electrical schematic of a biogrowth grooming system of a combined embodiment of FIGS. 12 through 18.

FIG. 20 is an electrical schematic of the embodiment of FIGS. 12 and 13, modified to include four valves associated with the middle trickle tower B, and including the biomass sensing arrangement of FIGS. 14 to 18 incorporated in each trickle tower A, B, and C. The four switches 176 of trickle tower A are connected to a common junction 194, which is connected to a timer circuit 195 in a control panel 198. The four switches 176 of each of towers B and C are similarly connected to timer circuits 196, 197, respectively. The outputs from the timers 195 to 197 feed into a programmable central processing unit CPU, outputs from which feed a circuit board 199 that in turn controls the operation of valve-actuating solenoids 201 to 212. Each of the valves 151 to 158 in FIGS. 12 and 13 has its own individual solenoid, as shown in FIG. 20. Additionally, in FIGS. 12 and 13, valves B1 and B4 are connected between the pipes 141 and 144 and the base tank 136 of trickle tower B, and the open connections 159 and 160 are replaced by valves B2 and B3. The valves B1, B2, B3, B4 are operable by the solenoids 202, 205, 208, 211, respectively. When a switch 176 in one of the towers A, B, or C sends a signal to the CPU, the appropriate solenoids are actuated to cause the valves 151 to 158 and B1 to B4 to change the sequence of flow through the towers. The sequence will follow the repeating pattern A-B-C→B-C-A→C-A-B. On the other hand, to obtain the previously described repeating pattern with B always in the middle, i.e. A-B-C→C-B-A, the CPU is programmed to keep the valves B1, B4 closed and the valves B2, B3 open throughout the sequence. The timers 195 to 197 are set so that once a signal has passed through a particular timer to the CPU, there is a predetermined delay before another signal can pass through that timer. This delay may be two weeks or more, e.g. three months, depending on the rate of atrophy of the biomass in the tower that just triggered the sequence change. The purpose of this delay is to stop hunting or premature changes in the sequence, the delay giving the tower triggering the last weight signal sufficient time to reduce in biomass weight well below the triggering threshold. The frequency at which the sequence is triggered to change depends upon the rate of growth of biomass on the biomedia, which in turn depends, inter alia, on the content of the wastewater, the rate of flow of the supply of wastewater, the size of the trickle tower system including the number of towers, and the construction of the biomedia.

In a simplified but not as effective method, the weight sensing system can be omitted, and the sequence changing based on a timing program operated by the CPU at fixed, preset intervals.

It will be appreciated from the above, that the present invention provides better control over biomass build up by employing various grooming techniques, and some preferred embodiments of the invention advantageously provide automatic grooming. The automatic grooming of the present invention not only enables extended continuous processing to be achieved, but enables this to be done with improved efficiency of processing, resulting overall in purer effluent.

The above-described embodiments, of course, are not to be construed as limiting the breadth of the present invention. Modifications, and other alternative constructions, will be apparent which are within the spirit and scope of the invention as defined in the appended claims.

What is claimed is:

1. A wastewater treatment apparatus, comprising:
   a plurality of trickle towers containing biomedia;
   a plurality of wastewater discharge means for discharging wastewater at upper ends of the trickle towers to enable the wastewater to pass down said biomedia;
   receptacles adjacent lower ends of the trickle towers for catching wastewater falling from the biomedia;

moving means for moving wastewater from said receptacles to said discharge means to enable wastewater to recirculate through the trickle towers; and a manifold, interconnecting said trickle towers, for enabling wastewater to be sequentially moved through said trickle towers in different selective sequences; and an automated sensor that responds to accumulation of growth on the biomedia.

2. The apparatus of claim 1, wherein said biomedia comprises vertically extending looped cord biomedia, and further comprising tensioning means for holding said looped cord biomedia under tension.

3. The apparatus of claim 1, wherein said manifold comprises a pipe system.

4. The apparatus of claim 1, wherein said manifold includes valves, and further comprising a control system connected to said valves and programmable to selectively operate said valves.

5. The apparatus of claim 1, wherein said manifold is connected to said trickle towers by selectively operable valves.

6. The apparatus of claim 1, further comprising:

signal means for creating a signal responsive to said automated sensor; and an indicator responsive to said signal to provide an indication of the accumulation of the biogrowth in said at least one trickle tower.

7. The apparatus of claim 1, wherein said manifold includes at least one valve, and said automated sensor causes actuation of said valve when said accumulation of biogrowth reaches a predetermined level.

8. The apparatus of claim 1, wherein:

said manifold comprises pipes connected to said receptacles by valves; and wherein the sensor causes at least some of said valves to be actuated to change the sequence of flow of the wastewater through said trickle towers upon said sensed increase in biogrowth reaching a predetermined level.

9. The apparatus of claim 1, wherein said automated sensor comprises a yieldable member yieldable to increase in weight of at least a part of said biomedia.

10. The apparatus of claim 1, wherein the sensor causes the sequence of movement of said wastewater through said trickle towers to change.

11. The apparatus of claim 1, further comprising means for independently sensing increase in biogrowth on the biomedia in each tower, and for causing the sequence in which the wastewater moves through the trickle towers to be changed so that the tower with the largest biogrowth is placed last in the sequence.

12. A wastewater treatment apparatus, comprising:

a plurality of trickle towers, each tower containing one or more cells, and each cell containing a plurality of vertically extending strands of biomedia;

said towers being interconnectable to enable the wastewater to pass through them in sequence;

valves associated with said towers for changing said sequence; and means, responsive to changes in weight of and connected to at least a part of the biomedia in at least one of said cells, for sensing increase in weight of said at least a part due to biogrowth forming thereon, and for causing operation of at least one of said valves to change said sequence when a predetermined weight increase is sensed.

13. The apparatus of claim 12, wherein said means includes a spring connected between said at least a part of the biomedia and the tower of that part, said spring at least partially supporting said part.

14. A wastewater treatment apparatus, comprising:

a trickle tower having a support structure;

strands of biomedia suspended from said structure, wastewater when being treated passing down said strands of biomedia; and a sensor that senses a change in tension or length of one or more of the strands of biomedia suspended from said structure.

15. The apparatus of claim 14, further comprising a second trickle tower.

16. A method of treating wastewater, comprising the steps of:

introducing a supply of wastewater into a first trickle tower containing biomedia and circulating this wastewater therethrough, the wastewater passing down through the biomedia and becoming partially treated;

after a time, passing the wastewater to a second trickle tower containing biomedia and circulating the wastewater therethrough to further treat the wastewater;

allowing biogrowth to build on the biomedia in said trickle towers;

sensing change in weight of at least a part of the biomedia in said first trickle tower due to the increase in biogrowth; and upon said change reaching a predetermined value, switching the sequence of flow of the wastewater through the trickle towers by introducing the supply of wastewater into the second trickle tower for the first partial treatment thereof.

17. The method of claim 16, wherein there are more than two trickle towers in the sequence of flow of the wastewater through the trickle towers, and the sequence of flow is switched each time a sensed increase in weight in one of the trickle towers reaches a predetermined value.

18. A method of treating wastewater, comprising the steps of:

passing wastewater sequentially through a plurality of trickle towers, the wastewater to be treated being introduced at one tower and the fully treated wastewater exiting at another tower;

monitoring the growth of biogrowth in the towers with an automated sensor; and when the monitored growth of biogrowth in any particular tower reaches a predetermined value, switching the sequence in which the wastewater passes through the plurality of trickle towers.

* * * * *